April 3, 1956   P. DANNENMANN   2,740,907
MULTIPOSITION APPLIANCE MOTOR UNIT
Filed Feb. 11, 1953

INVENTOR
PAUL DANNEMANN
ATTORNEY

United States Patent Office 2,740,907
Patented Apr. 3, 1956

2,740,907

MULTIPOSITION APPLIANCE MOTOR UNIT

Paul Dannenmann, Welzheim, Wurttemberg, Germany, assignor to G. Bauknecht G. m. b. H., Stuttgart, Germany, a limited partnership of Germany Application February 11, 1953, Serial No. 336,403

Claims priority, application Germany February 15, 1952

4 Claims. (Cl. 310—66)

The present invention relates to household appliances, particularly kitchen appliances in which a single drive motor is used to drive one or several of a variety of accessories or implements, such as fruit squeezers, mixers, dough kneaders, meat grinders or choppers, coffee grinders, etc.

Such accessories or implements require different rotational speeds for satisfactory operation.

There are already known for industrial purposes motor drives for different accessories or implements in which bases or driving sockets for the accessories to be driven are structurally combined with the motor housing. Motor drives of this type are generally equipped with electric speed regulating means. It is also known to provide driving sockets including step-up or step-down transmission means, such as a gear train, which are attachable to the motor housing for connection with the drive shaft of the motor. These sockets serve to receive the respective accessories.

Industrial motor drives, as hereinbefore referred to, are too cumbersome, complicated and expensive for use in connection with household appliances. Also, the use of the aforesaid speed varying means results in a substantial increase in the overall height of the motor housing and, hence, of the position of the accessories thereby increasing the danger of a tilting of the appliance. Furthermore, industrial motor drives are frequently heavy and require a fixed mounting.

As will now be apparent, variable speed drives for driving accessories or implements, requiring different rotational speeds as hitherto known for industrial purposes, are not suitable for use in connection with household appliances.

One object of the present invention is a novel and improved motor drive for household appliances, the motor housing of which is formed with several adapter bases adapted to receive different accessories or implements and includes different transmission means associated with said adapters so that each accessory can be fitted directly upon the adapter supplying the specific speed required for the respective accessory.

Another objective of the invention is to provide a novel and improved household appliance of the kind hereinabove referred to, which is sturdy in design, light in weight and comparatively small, so that it can be easily stored and set aside like any other household utensil.

Another object of the invention is to provide a motor housing of generally cylindrical shape, the peripheral side wall and face walls of which are equipped with driving sockets so that the motor housing can be selectively placed in a horizontal or vertical position for connecting thereto one or more accessories.

Still another object of the invention, associated with the preceding one, is to provide on the motor housing support means which steady the housing in its horizontal or vertical position, and also form grip means facilitating moving of the appliance.

Other and further objects, features and advantages of the invention will be pointed out hereafter and set forth in the appended claims forming part of the application.

In the accompanying drawing, several now preferred embodiments of the invention are shown by way of illustration and not by way of limitation.

Figure 1:
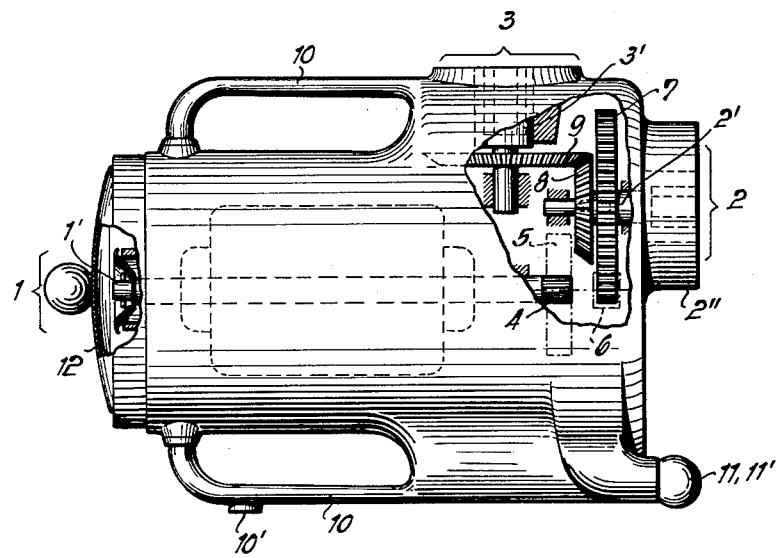
Fig. 1 is an elevated side view, partly in section, of a motor drive according to the invention.

Referring first to Fig. 1 in detail, the driving device, according to this figure, comprises a conventional motor which may be an A. C., D. C. or universal motor. The housing of the motor, generally designated by 15, may be of any suitable configuration; it is shown as having a generally cylindrical shape. Both face walls of the housing and its circumferential wall are formed with adapter bases 1, 2 and 3 respectively, for attachment of a variety of accessories or implements. Each of the three adapters includes a driving socket 1', 2' and 3' respectively, for one of the accessories to be driven by the motor. Driving socket 1' is designed to drive an accessory directly, that is, with the rotational speed of the motor shaft 17. For this purpose, driving socket 1' is connected directly with the motor shaft or integral therewith. The driving sockets 2' and 3' are designed to drive accessories which require a rotational speed different from that directly supplied by the motor shaft. The rotational speed of the receiving sockets 2' and 3' may either be stepped up or stepped down. For this purpose, the motor shaft 17 is coupled with the driving sockets 2' and 3' by any transmission means of any suitable design. According to the exemplification of Fig. 1, motor shaft 17 supports a pinion 4, which is in mesh with a gear 5, coupled with a second pinion 6. Pinion 6 drives a gear 7 fixedly secured on a shaft 16 of driving socket 2'. As a result, driving socket 2' is rotated with a rotational speed corresponding to the ratio of transmission of the gear train just described. Gear 7 is operatively connected with a bevel gear 8 which for this purpose is keyed upon shaft 16, upon which gear 8 is also keyed. Gear 8 is in mesh with a second bevel gear 9 which, in turn, drives socket 3'.

It will be apparent that the invention is not limited to the provision of three driving sockets, but that a larger or smaller number of sockets may be provided.

The three adapter bases 1, 2 and 3 are preferably disposed in the same vertical diametric plane through the housing.

To facilitate carrying of the appliance and to steady the same when in operation, two handles or grips 10 are provided on diametrically opposite sides of housing 15. These grips, which at one end are faired into the housing, are disposed in the same diametric plane as the driving sockets and bases.

Figure 2:
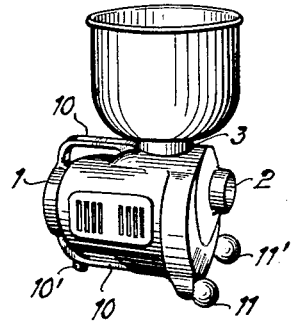
Fig. 2 is a perspective side view of the motor drive, showing the motor housing in horizontal position with an accessory attached thereto.
Figure 3:
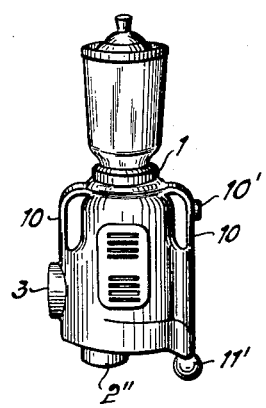
Fig. 3 is a perspective view of the motor drive, showing the motor housing in vertical position with an accessory attached thereto.

For the purpose of steadying the housing either in the horizontal position of Figs. 1 and 2, or in the vertical position of Fig. 3, short legs 10', 11 and 11' in form of buffers are provided. The disposition of these buffers is clearly shown on the figures. As will be apparent, buffer 10' and buffers 11 and 11' are disposed in the same plane in triangular arrangement, so that these buffers form a broad and reliable base for the housing in horizontal position. Similarly, buffers 11 and 11' and the face of adapter base 2 are disposed in the same plane in triangular arrangement, thereby forming a broad base for supporting the housing in vertical position. Buffer 10' may be omitted, in which case the housing will rest upon the respective grip 10, but the steadiness of the driving device is increased by the provision of buffer 10'. As is best shown in Fig. 1, the adapter 2 and driving socket 2' are encased by a collar or cowling 2" for broadening the support base for the housing in its vertical position.

To protect the driving sockets when not in use a cover for these sockets may be provided. There is shown a cover 12 fitted upon adapter base 1 and socket 1'. The cover may be attached to the housing or the respective base 1 by springy clips or other suitable means.

The motor shaft 17 ends within the housing and all the gear or other transmission means are also disposed within the housing 15, so that the overall dimensions of the housing are kept within acceptable limits.

The arrangement of the two grips 10 in the same diametric plane as the adapter bases and driving sockets has the advantage that the drive motor and accessories attached thereto can be safely held by the operator both in vertical and horizontal position. When the motor drive is placed in the vertical position of Fig. 3 and an accessory, such as a mixer jar 18, is fitted in socket 1' the motor drive can be conveniently and strongly held by gripping both grips or handles 10. In the horizontal position of the motor drive the only handle that is available to exert a pressure in a downward direction and also to hold the drive is the then upper handle 10. This has the advantage that the operator is not likely to apply to the housing a force tending to tilt the same, as would be easily possible if the two handles 10 would be spaced from each other by an angle of 90°, rather than 180°.

The accessories and implements, in particular those that are operated with a horizontal drive shaft, such as meat choppers, dough kneaders, etc., can be attached to driving socket 2' when the motor drive is in its horizontal position. In the vertical position of the motor drive, the accessory can be fitted in socket 3', as is shown for a mixing bowl 19.

As previously mentioned, the adapter base 1 or, more specifically the driving socket 1', is connected directly with motor shaft 17, so that this socket is particularly suitable for accessories requiring a high rotational speed, such as the mixer of Fig. 3. In case it is necessary to operate an accessory for which a high rotational speed is undesirable in vertical position, the housing is placed in its horizontal position in which the low speed driving socket 3' is available.

As will be apparent from the previous description, the disposition of the three driving sockets permits to select for each accessory the most suitable position and rotational speed by simply placing the housing either in its horizontal or vertical position. It will further be observed that in either position of the housing two driving sockets are available. Furthermore, the arrangement of handles 10 and the buffers 10', 11 and 11' make it convenient to hold the motor drive steady in either position, without any danger of an accidental tilting of the housing and an accessory attached thereto.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

I claim:

1. A driving device for a household appliance adapted to coact with several rotary accessories having operational speeds different one from another, the said device comprising an electric motor having an elongated housing and a driving shaft within said housing, a plurality of flat adaptor bases including driving sockets adapted for driving engagement with said accessories on the peripheral side wall and the face walls respectively of said motor housing, several support means generally radially extending from the peripheral side wall of said housing for supporting the housing in horizontal position, two of said support means being elongated beyond the general plane of one of said face walls, the said two support means in conjunction with the adaptor base in the said plane forming a three-point base for supporting the housing in vertical position, the said driving sockets and the motor shaft being all situated in a diametric plane of the housing perpendicular in both the horizontal and vertical position of the housing, and a corresponding number of transmission means operatively connecting said sockets with said drive shaft and disposed within the housing, the said transmission means having ratios of transmission different one from another.

2. A driving device according to claim 1, wherein the said support means form grips and legs respectively for supporting and steadying the housing in the respective position.

3. A driving device according to claim 2, wherein the said grips are also disposed in said perpendicular plane.

4. A driving device according to claim 3, wherein said legs and grip are disposed to form with each other and the adaptor base disposed in the respective one of the face walls of the housing support bases defining planes of generally triangular outline in both vertical and horizontal position of the housing.

References Cited in the file of this patent

UNITED STATES PATENTS

| 2,262,912 | Behar | Nov. 18, 1941 |

FOREIGN PATENTS

| 544,672 | Great Britain | Apr. 23, 1942 |
| 645,701 | Germany | June 2, 1937 |
| 253,909 | Switzerland | Nov. 16, 1948 |